Oct. 3, 1961     A. J. IMMESOETE     3,002,573
EARTH MARKER
Filed March 19, 1958     3 Sheets-Sheet 1
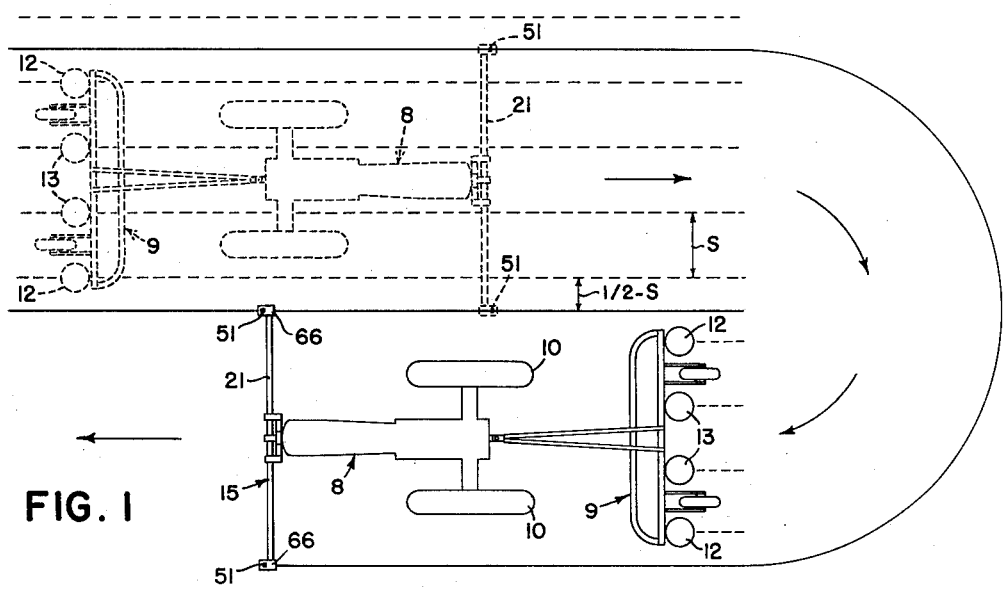
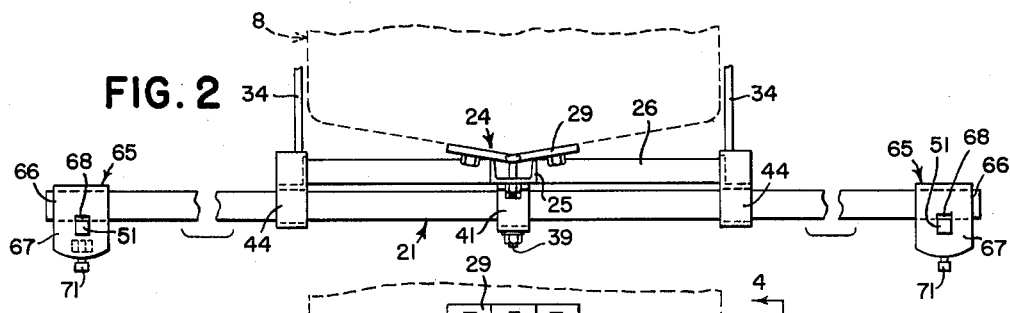
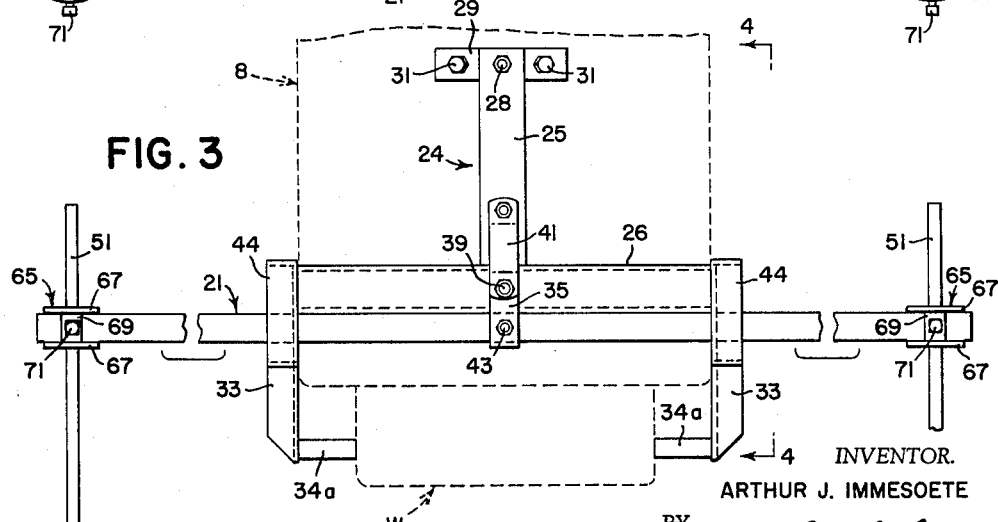
INVENTOR.
ARTHUR J. IMMESOETE
ATTORNEYS Oct. 3, 1961  A. J. IMMESOETE  3,002,573
EARTH MARKER
Filed March 19, 1958  3 Sheets-Sheet 2
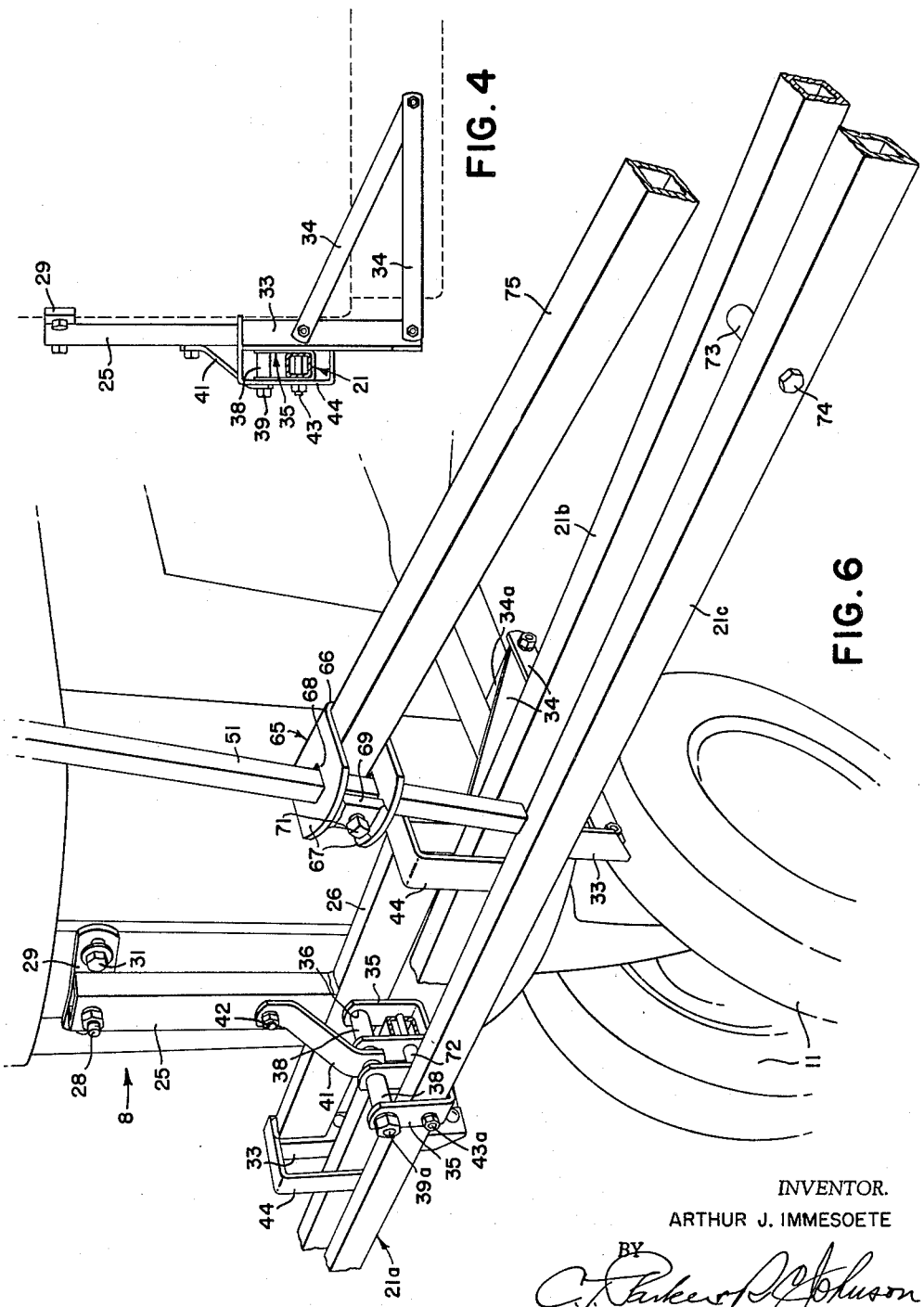
INVENTOR.
ARTHUR J. IMMESOETE
BY
ATTORNEYS Oct. 3, 1961     A. J. IMMESOETE     3,002,573
EARTH MARKER
Filed March 19, 1958                                  3 Sheets-Sheet 3
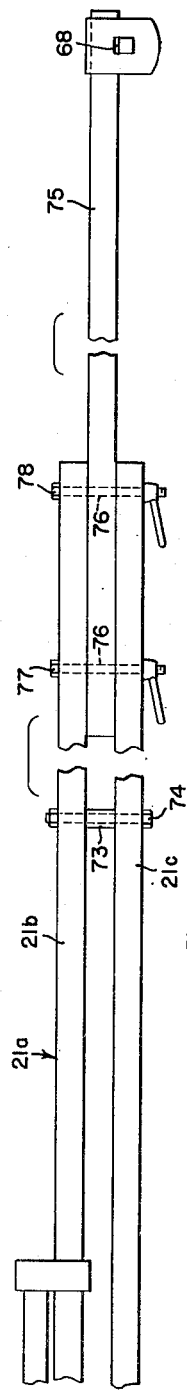
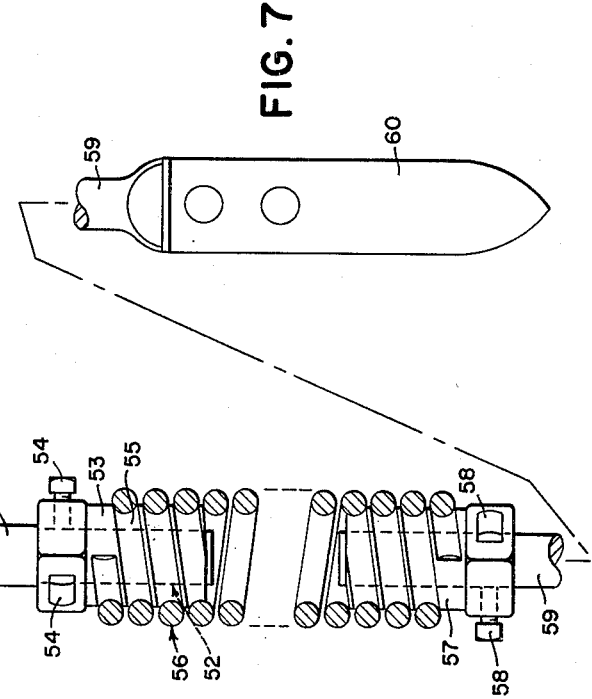
INVENTOR.
ARTHUR J. IMMESOETE
BY
ATTORNEYS

United States Patent Office 3,002,573
Patented Oct. 3, 1961

3,002,573
EARTH MARKER
Arthur J. Immesoete, Moline, Ill., assignor, by mesne assignments, to Deere & Company, a corporation of Delaware
Filed Mar. 19, 1958, Ser. No. 722,447
1 Claim. (Cl. 172—126)

The present invention relates generally to agricultural implements and more particularly to mark forming means adapted to be carried by or supported in operative connection with implements of the kind that are adapted to form a plurality of rows, such as a tractor propelled four-or-six-row corn planter, for example.

The object and general nature of the present invention is a provision of a tractor mounted row marker adapted to be used with a wide variety of planters and other tractor propelled row crop equipment. Conventionally, marker means for multi-row planters and the like have been constructed with a marker arm at each side of the implement, one or the other of such marker arms being lowered alternately so as to make a mark in the ground which can be followed by the implement on the next ground, it being customary in tractor mounted or tractor towed planters to form the marks so that at each round the center of the tractor can be lined up with the mark formed on the previous round so as to have all of the planter rows spaced apart uniformly. In such implements as four and six row planters, for example, the marker arms become excessively long and more or less unwieldy and it is the purpose of the present invention to provide a new and improved marker mechanism which does not require marker arms of excessive length, even for wide multi-row implements such as six row planters. Specifically, therefore, it is an important feature of this invention to provide marker mechanism in which two mark-forming means, one on each side of the outfit, are employed to form two marks in the ground spaced laterally outwardly of the outer runner or other row forming means a distance equal only to one-half the row spacing, so that when the outfit is turned around, as at the end of the field, the proper row spacing is secured merely by guiding the outfit so as to cause one of the mark-forming means to follow the mark formed by the same mark-forming means on the previous round. In this way, the necessity for marker arms of excessive length is avoided and, what is probably even more important, the necessity for providing marker arm reversing means is entirely eliminated for, according to this invention, the two marker arms are always in mark-forming position and in operation there is no requirement to raise one or the other of the marker arms alternately.

These and other objects and advantages of the present invention will be apparent to those skilled in the art after a detailed description, taken in conjunction with the accompanying drawings in which:

FIG. 1 is a general plan view of a four-row tractor mounted planter in which the principles of the present invention have been incorporated.

FIG. 2 is an enlarged plan view of a marker mechanism employed in the outfit shown in FIG. 1.

FIG. 3 is a front view of a marker mechanism shown in FIG. 2.

FIG. 4 is a sectional view taken generally on the lines 4—4 of FIG. 3.

FIG. 5 is a fragmentary plan view showing the marker mechanism of FIGS. 1-4 equipped with extension bars whereby the apparatus is adapted to be used with a six row planter or other similar implements.

FIG. 6 is a fragmentary perspective view of the apparatus shown in FIG. 5, illustrating the transport or folded position of the mark-forming means.

FIG. 7 is a detail view, partly in section, showing the cushioned mark-forming elements.

Referring first to FIG. 1, the present invention has been shown by way of illustration as incorporated in a tractor towed four row planter in which the planter and tractor per se are of generally conventional construction. In FIG. 1, the tractor 8 upon which the planter 9 is mounted or by which it is towed is of the usual construction, including a rear axle having laterally spaced apart drive wheels 10 and a front end supported on closely spaced front wheel means 11. For four row planting, for example, the rear wheels 10 are spaced apart so as to operate in between the lines of travel of the two outer planter furrow openers or runners 12 while the centrally disposed front wheel means 11 operate in between the lines of travel of the two inner runners 13. The mark forming mechanism of the present invention is indicated in its entirety in FIG. 1 by the reference numeral 15 and is shown as supported on the front of the tractor more or less entirely independent of the planter 9 that is shown by way of illustration as towed at the rear of the tractor.

As will be best seen from FIGS. 2 and 3, the marker mechanism of this invention includes a rigid transverse member 21, preferably in the form of a tubular bar or the like that extends laterally outwardly from each side of the tractor a distance beyond the line of travel of the outermost furrow opening runners 12 that is equal to one-half the row spacing, indicated at $s$ in FIG. 1. The bar 21 is supported on the front of the tractor by suitable supporting means, preferably in the form of a tractor-carried bracket assembly 24 that includes a vertical channel 25 to the lower end of which a horizontal channel member 26 is welded. The upper end of the vertical channel 25 is connected, as by bolt means 28, to a connecting plate 29, the latter being shaped to fit the front upper portion of the tractor 8 to which it is fixed by suitable fasteners 31 that connect into attaching points which ordinarily form a part of the tractor. The lower horizontal channel 26 is secured at its ends, as by welding, to the upper portions of a pair of brace legs 33, each in the form of an angle, the lower portions of which are fixed to the sides of the tractor by horizontal and angular braces 34 and suitable weight-clearing spacers 34a. The arrangement is such so that the supporting bracket structure 24, particularly the channel 26, clears any weights W that may be mounted on the tractor.

The supporting bar 21 for the mark-forming means, carried at the other end of the bar 21, is supported by the bracket means 24 for swinging in a generally vertical transverse plane on a fore-and-aft extending axis. The member 21, which is perferably a tubular part generally square or rectangular cross section, is connected at its central portion to a U-shaped pivot clamp member 35 the upper end portions of which is apertured, as at 36, to receive a tubular pivot spacer 38 that extends through the openings 36 and is carried on a fore-and-aft extending bolt 39, one end of which is extended through an opening in the lower portion of the vertical channel 25. The other end of the pivot-supporting bolt 39 is carried by an angular pivot brace 41, the upper end of which is bolted, as at 42, to the generally lower portion of the vertical channel 25, the lower portion of the brace 41 being apertured to receive the supporting bolt 39. It will be noted that the bar-carrying clamp member 35 is thus supported for rocking movement on the supporting structure 24 by the pivot spacer 38. The tubular bar 21 is connected to the pivot clamp 35 by bolt means 43 that extends through suitable apertures in the clamp member 35 and in the central part of the transverse rigid bar 21.

Means is provided to limit oscillation of the rigid bar 21, such means comprising marker tube confining loop members 44 secured at their upper and lower portions, as by welding, to the upper portions of the angles 33. The members 44 thus serve as stop means limiting the permissive oscillation of the marker tube or bar 21 but allowing sufficient relative movement to accommodate passage of the outfit over uneven terrain.

According to the principles of this invention, mark-forming means is carried at the outer ends of the marker bar 21. Preferably, each of such mark-forming means comprises a vertical rod 51, the lower end 52 of which is machined or otherwise shaped to form a round portion that is insertable into an upper spring plug 53, the latter having a head section that is tapped to receive a pair of locking set screws 54. The spring plug 53 is shaped with helical portions 55 adapted to rigidly receive the upper end of a relatively heavy coil spring 56, the lower end of which is received by a lower spring plug 57 that is substantially identical with the upper spring plug 53. Connected into the head section of the lower spring head plug 57 as by set screw means 58, is a point support 59 carrying a mark-forming element 60 fastened in any suitable way to the lower end of the point support 59, preferably removably.

The upper end of the marker rod 51 is received in clamp means 65, there being one of such means at each end of the marker bar 21. Each clamp means 65 comprises a U-shaped clamp part 66 having upper and lower legs 67 that are apertured, as at 68, to receive the upper portion of the associated vertical marker member 51. The latter member, at least at the upper portion thereof, is generally square in cross section and the openings 68 are rectangular, whereby the member 51 is capable of limited transverse movement within the clamp member 66. The end portions of the clamp parts 67 carry a tapped block 69, the latter being secured to the clamp 66 in any suitable means, such as welding. Disposed within the tapped opening in the block 69 is a set screw 71 that, when tightened, bears against the adjacent side of the marker rod member 51, forcing the latter into firm engagement with the associated end of the marker bar 21 about which the U-shaped clamp member 66 is disposed. Thus, when the set screws 71 are tightened, the associated marker rods 51 are rigidly secured to the associated marker bar 21 in generally downwardly depending relation.

The operation of the marker mechanism as so far described is substantially as follows. The vertical positions of the two marker members 51 are adjusted so that the points or elements 60 form the desired marks in the ground as the outfit is driven across the field. As can be seen from FIG. 1, each of the two mark forming means 60 is located substantially exactly a half row spacing, indicated at ½s, laterally outwardly of the outermost row. This makes it possible to turn the outfit at the end of the field so that on the next round the marker then at the side where the rows have already been planted will follow the mark formed in the ground by the same marker on the previous round. In this way, all of the rows planted will be disposed substantially exactly the same distance apart. Experience has shown that very accurate planting can be done for a marker element when passing along the surface of the ground can be caused to follow a previously formed mark much more accurately than, for example, is possible where the tractor must be driven so as to straddle a centrally disposed mark. Furthermore, according to this invention, it is not necessary, as when turning at the end of the field, to raise or lower one or the other of the marker arms since according to this invention both markers move along the surface of the ground independently of whether the tractor during planting is driven in one direction or the other across the field. Additionally, the marker supporting bar 21 extends only a relatively small distance outwardly beyond the planting units, and hence no difficulty ordinarily is encountered in driving the outfit along roads or through places where any four row planter may be moved.

Whenever it is desired to transport the planter from field to field, along highways, or the like, all that is necessary to do to raise the mark forming element out of ground engaging position, is to loosen the associated set screws 71, raise the marker rod 51 upwardly so that the mark forming points or elements 60 are disposed above the surface of the ground, and then retighten the set screws 71 to hold the parts 60 above the ground.

The principles of the present invention have been described above in connection with a four row planter. In many cases six row planters are available, and generally speaking, are preferred by farmers who plant sufficient acreage for their use. The marker mechanism of the present invention is also well adapted for use with six row planters. Accordingly, marker mechanism embodying the principles of this invention but modified for six row planters will now be described.

Referring now particularly to FIG. 5, for six row planters, the tractor mounted laterally extending marker bar means indicated in its entirety by the reference numeral 21a, comprises two marker bars 21b and 21c, each being substantially identical to the bar 21 described above. One of the two bars 21b and 21c is mounted and supported substantially exactly the same as the bar 21 described above. The other marker bar, indicated at 21c, is rigidly attached in spaced apart relation to the bar 21b by means that comprises suitable center and outer tubular spacers 72 and 73, and associated bolt means 74 extending through holes in the bars 21b and 21c. Where two marker bars 21b and 21c are employed, a bolt 39a replaces and is longer than the center pivot bolt 39 described above, and two spacers 38 and two pivot clamp members 35 are used, as best shown in FIG. 6. Also, a longer bolt 43a replaces the bolt 43, the bolt 43a being long enough to pass through the two associated bars 21b and 21c. Thus, the two bars 21b and 21c are rigidly fastened together and are supported for oscillation by the tractor-carried structure 24 through the same pivot clamp means 35, described above.

For as in four row operation, the mark-forming means are disposed laterally outwardly a distance equal to one-row spacing further than the lines of travel of the associated outermost runners. This requires a support bar means 21a that is longer than the bar 21 shown in FIG. 1 where four row planting operation is accommodated. To provide this additional distance, while using two bars 21 (shown at 21b and 21c), two bar extensions 75 are mounted between the outer end portions of the two spaced-apart bars 21b and 21c. To this end, each bar extension 75 is apertured at two points, as indicated at 76, and receive two bolt means 77 and 78 that extend through alined openings in the end portions of the bars 21b and 21c. By virtue of the pairs of bolts 77 and 78 and associated parts the connection between each extension bar 75 and the associated supporting bar means 21a is rigid and the parts form a rigid transversely extending structure carrying the outer mark-forming means. In this form of the invention, the mark-forming means is the same as that described above, the only difference being that the marker clamps 66 and associated parts are fixed to the outer ends of the bar extensions 75, rather than to the bar member 21 as in the form of the invention shown in FIG. 1.

The transverse structure 21a is, of course, appreciably longer than the marker support bar structure 21, and therefore it may be desirable to reduce the length of the six row marker supporting structure 21a when driving along roads and highways, passing through gates or the like. According to this invention, by taking out the laterally outer bolt 78, each bar extension 75 may be then swung upwardly and laterally inwardly into a folded position, each extension moving about the inner bolt 77 as a center, as shown in FIG. 6. No additional structure is necessary to support the extensions 75 in their inwardly folded position, for in the latter position the normally upper ends of the rods 51 will engage one or the other of the bars 21b and 21c and serve as a stop to support the extensions in the folded position. This procedure may also be used when it is desired to transport the outfit with the six-row mark-forming means raised out of ground engaging position.

While I have shown and described above a preferred structure in which the principles of the present invention have been incorporated, it is to be understood that my invention is not to be limited to the particular details shown and described, but that, in fact, widely different means may be employed in the practice of the broader aspects of my invention.

What I claim, therefore, and desire to secure by Letters Patent is:

A tractor mounted row marker for use with tractor propelled multi-row implements, said row marker comprising a support attachable to the front of a tractor and including a generally vertically extending member, a rigid marker bar adapted to be disposed transversely across the front of the tractor, ground-engaging mark-forming means carried by the end portions of said marker bar, a fore-and-aft extending pivot member supported at its rear end on said vertically extending member, an angled pivot brace connected at its upper end to said vertically extending member and extending downwardly and forwardly therefrom and connected at its lower end to the forward end of said pivot member, a pivot clamp fixed to the central portion of said rigid marker bar and extending upwardly therefrom and swingably supported on said fore-and-aft extending pivot member, and bar-limiting means carried by said support for limiting the extent of oscillation of said rigid marker bar.

References Cited in the file of this patent

UNITED STATES PATENTS

| | | |
|---|---|---|
| 231,683 | Rickey | Aug. 31, 1880 |
| 568,534 | Huff | Sept. 29, 1896 |
| 605,702 | Donaldson | June 14, 1898 |
| 934,575 | Schrieber | Sept. 21, 1909 |
| 976,677 | Morris | Nov. 22, 1910 |
| 1,241,173 | Von Meyenburg | Sept. 25, 1917 |
| 1,888,502 | Holstein | Nov. 22, 1932 |
| 2,175,282 | Cormany | Oct. 10, 1939 |
| 2,483,011 | Hudson | Sept. 27, 1949 |
| 2,613,586 | Boenig | Oct. 14, 1952 |
| 2,780,977 | Browning | Feb. 12, 1957 |
| 2,850,958 | Robinson | Sept. 9, 1958 |

FOREIGN PATENTS

| | | |
|---|---|---|
| 611,343 | Great Britain | Oct. 28, 1948 |